United States Patent
Gao

(10) Patent No.: US 12,209,675 B2
(45) Date of Patent: Jan. 28, 2025

(54) PRESSURE RELIEF VALVE FOR BATTERY PACK AND BATTERY PACK

(71) Applicant: Ford Global Technologies, LLC, Dearborn, MI (US)

(72) Inventor: Fei Gao, Hefei (CN)

(73) Assignee: Ford Global Technologies, LLC, Dearborn, MI (US)

(*) Notice: Subject to any disclaimer, the term of this patent is extended or adjusted under 35 U.S.C. 154(b) by 41 days.

(21) Appl. No.: 17/979,426

(22) Filed: Nov. 2, 2022

(65) Prior Publication Data
US 2023/0175604 A1     Jun. 8, 2023

(30) Foreign Application Priority Data
Dec. 3, 2021 (CN) .............................. 202111471273

(51) Int. Cl.
*F16K 17/08*        (2006.01)
*B60L 50/64*        (2019.01)
*F16K 27/02*        (2006.01)
*H01M 50/325*       (2021.01)

(52) U.S. Cl.
CPC .............. *F16K 17/08* (2013.01); *B60L 50/64* (2019.02); *F16K 27/02* (2013.01); *H01M 50/325* (2021.01); *H01M 2200/20* (2013.01); *H01M 2220/20* (2013.01)

(58) Field of Classification Search
CPC .................................. F16K 17/08; F16K 27/02
See application file for complete search history.

(56) References Cited

U.S. PATENT DOCUMENTS

| | | | |
|---|---|---|---|
| 5,554,455 A | 9/1996 | Inoue et al. | |
| 2016/0036025 A1 | 2/2016 | Hofer | |
| 2021/0148477 A1* | 5/2021 | Canjuga | ................... F16K 3/265 |
| 2022/0223970 A1* | 7/2022 | Okabayashi | .......... H01M 50/35 |

FOREIGN PATENT DOCUMENTS

| | | | |
|---|---|---|---|
| CN | 102729923 A | | 10/2012 |
| CN | 205978682 U | | 2/2017 |
| CN | 109904367 A | | 6/2019 |
| CN | 114110221 A | * | 3/2022 |

* cited by examiner

*Primary Examiner* — P. Macade Nichols
(74) *Attorney, Agent, or Firm* — David B. Kelley; Carlson, Gaskey & Olds, P.C.

(57) ABSTRACT

A pressure relief valve includes a valve body; a valve cover matched with the valve body; a flexible element positioned between the valve body and the valve cover and having a through hole; and a breathable film covering the through hole. The flexible element has a compression portion at least partially surrounding the through hole and configured to be deformable to make the flexible element displace relative to the valve body. A battery pack can use the pressure relief valve. Due to the use of the pressure relief valve, internal pressure of the battery pack can be controlled.

20 Claims, 5 Drawing Sheets

PRESSURE RELIEF VALVE FOR BATTERY PACK AND BATTERY PACK

CROSS-REFERENCE TO RELATED APPLICATIONS

This disclosure claims priority to Chinese Patent Application No. 202111471273, which was filed on 3 Dec. 2021 and is incorporated herein by reference in its entirety.

TECHNICAL FIELD

The present disclosure generally relates to the technical field of vehicles, and more specifically, to a pressure relief valve for a battery pack of a vehicle and a battery pack using the pressure relief valve.

BACKGROUND

Usually, pressure relief valves are used for pressure exchange between closed containers and outside to achieve a desired pressure balance. In practical applications, pressure relief valves have a variety of structures and rich application scenarios. In the field of vehicles, electrified vehicles have developed rapidly due to their advantages in reducing fuel consumption and exhaust emissions. Electrified vehicles include, but are not limited to, hybrid vehicles, plug-in hybrid vehicles and pure electric vehicles. Typical electrified vehicles include battery packs. Pressure relief valves are often used in these battery packs.

There are various pressure relief valve configurations in the prior art. For example, patent application US20160036025 discloses a pressure relief valve for a housing of a battery, which includes a support element, a breathable and waterproof membrane, and a tensioning frame that presses the breathable and waterproof membrane against the support element. Spring elements on the tensioning frame further restrict the movement through a cover.

SUMMARY

The present disclosure is directed toward exemplary pressure relief valves and a battery packs including these pressure relief valves.

According to an exemplary embodiment of the present disclosure, a pressure relief valve for a battery pack is provided, that comprises: a valve body; a valve cover matched with the valve body; a flexible element positioned between the valve body and the valve cover and having a through hole; and a breathable film covering the through hole; wherein the flexible element has a compression portion at least partially surrounding the through hole and configured to be deformable to make the flexible element displace relative to the valve body.

According to an embodiment of the present disclosure, the flexible element is made of rubber material.

According to an embodiment of the present disclosure, the pressure relief valve can have a protective wall surrounding the valve body and having an outer surface and an inner surface.

According to an embodiment of the present disclosure, the protective wall is detachably connected to the valve body, and the outer surface is detachably connected with a shielding pipe.

According to an embodiment of the present disclosure, the flexible element has a circumferential wall portion that surrounds the through hole and extends upward in an axial direction, and the compression portion is arranged on the circumferential wall portion.

According to an embodiment of the present disclosure, the compression portion is provided as at least one convex or concave part extending from the circumferential wall portion along a radial direction from center of the through hole towards the circumferential wall portion.

According to an embodiment of the present disclosure, the compression portion is provided as a plurality of convex and concave parts spaced in the axial direction on the circumferential wall portion.

According to an embodiment of the present disclosure, the circumferential wall portion has an outer flange at the opening, and the outer flange is pressed in a groove arranged on the valve body by the valve cover.

According to an embodiment of the present disclosure, guide pins extending downward along the axial direction are arranged at the bottom of the flexible element, and the guide pins are configured to be accommodated in fitting holes arranged on the valve body.

According to an embodiment of the present disclosure, the pressure relief valve also has a spring positioned between the valve cover and the flexible element, and the flexible element is offset by the spring to contact the valve body.

According to an embodiment of the present disclosure, at least one rib is arranged on the outside of the bottom of the flexible element and extends on the surface of the outside.

According to the present disclosure, a pressure relief valve is provided, that comprises: a valve body; a valve cover matched with the valve body; a flexible element positioned between the valve body and the valve cover and having a compression portion and a through hole; and a breathable film covering the through hole; wherein the breathable film forms a first fluid channel of the pressure relief valve, and the flexible element and the valve body together form a second fluid channel of the pressure relief valve; and when internal pressure of the pressure relief valve is less than a pressure threshold, the first fluid channel remains open; and when the internal pressure is greater than or equal to the pressure threshold, both the first fluid channel and the second fluid channel remain open.

According to an embodiment of the present disclosure, the compression portion is configured to be deformable to make the flexible element displace relative to the valve body to open the second fluid channel when the internal pressure is greater than or equal to the pressure threshold.

According to an embodiment of the present disclosure, when the internal pressure is less than the pressure threshold, the flexible element rests against the valve body and closes the second fluid channel.

According to an embodiment of the present disclosure, the through hole is arranged at the bottom of the flexible element; and the flexible element also has a circumferential wall portion that surrounds the through hole and extends upward in a vertical direction, and the compression portion is arranged on the circumferential wall portion.

According to an embodiment of the present disclosure, the compression portion is provided as at least one convex or concave part extending from the circumferential wall portion along a radial direction from center of the through hole towards the circumferential wall portion.

According to an embodiment of the present disclosure, the compression portion is provided as a plurality of convex and concave parts spaced in an axial direction on the circumferential wall portion.

According to an embodiment of the present disclosure, the pressure relief valve also has a protective wall, the protective wall has an outer surface and an inner surface, and the outer surface is detachably connected with a shielding pipe.

According to an embodiment of the present disclosure, the pressure relief valve also has a spring positioned between the valve cover and the flexible element, and the flexible element is offset by the spring to contact the valve body to close the second fluid channel.

According to the present disclosure, a battery pack for a vehicle is provided, that comprises a housing and a pressure relief valve arranged on the housing, wherein the pressure relief valve comprises: a valve body, a valve cover matched with the valve body; a flexible element positioned between the valve body and the valve cover and having a compression portion and a through hole; and a breathable film covering the through hole; wherein the breathable film forms a first fluid channel of the pressure relief valve, and the flexible element and the valve body together form a second fluid channel of the pressure relief valve; and when internal pressure of the pressure relief valve is less than a pressure threshold, the first fluid channel remains open; and when the internal pressure is greater than or equal to the pressure threshold, both the first fluid channel and the second fluid channel remain open The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

For a better understanding of the present disclosure, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the figures, like reference numbers refer to like parts throughout the different figures, in which.

DETAILED DESCRIPTION

Figure 1:
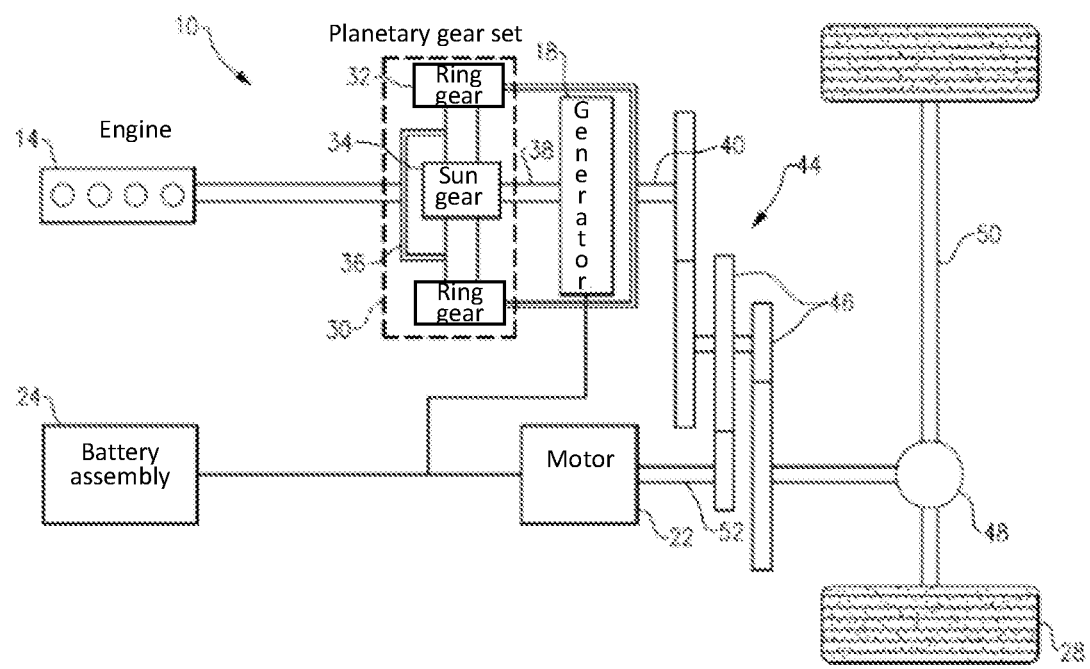
FIG. 1 shows a highly schematic view of a powertrain of an electrified vehicle to which a battery pack according to the present disclosure can be applied.

Embodiments of the present disclosure will now be described in detail with reference to the accompanying drawings. For reference numbers in the drawings, the same or similar reference numbers are used to designate the same or similar parts. In the following description, various operating parameters and components are described in various embodiments. These specific parameters and components are included herein by way of example only and are not meant to be limiting.

The embodiments of the present disclosure are described below. However, it is to be understood that the disclosed embodiments are merely examples and that other embodiments may take various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure. As will be understood by those of ordinary skill in the art, various features shown and described with reference to any one figure may be combined with features shown in one or more other figures to produce embodiments not expressly shown or described. The combinations of features shown provide representative embodiments for typical applications. However, various combinations and modifications of the features consistent with the teachings of the present disclosure may be desirable for certain particular applications or implementations In this document, relational terms, such as first and second and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "and/or", when used in a list of two or more items, means that any one of the listed items can be employed by itself, or any combination of two or more of the listed items can be employed.

One or more embodiments of the present disclosure will be described below with reference to the accompanying drawings. The flowchart is used to illustrate an example of a process executed by a system. It should be understood that the execution of the flowchart does not need to be performed in sequence, and one or more steps may be omitted, or one or more executed steps may be added, and one or more steps may be performed sequentially or in reverse order, and even in some embodiments concurrently.

As mentioned in the background, the pressure relief valves can be used for pressure exchange between the closed containers and the outside to achieve a desired pressure balance. With the rapid development of electrified vehicles due to their advantages in reducing fuel consumption and exhaust emissions, the pressure relief valves are commonly used on battery packs to facilitate sealing of battery packs and gas exchange at different rates under different pressures.

In one or more embodiments, the inventors of the present disclosure propose a pressure relief valve that may have one or more advantages of structural robustness, connection convenience, and testing convenience. In one or more embodiments, the present disclosure provides a battery pack, which can maintain bidirectional gas exchange and pressure balance of the breathable film under conventional pressure conditions, and can effectively reduce the pressure in the battery pack under thermal shock change caused by rapid heat generation. In one example, when the internal pressure of the battery pack is 0.5 kilopascals, air flow path provided by the pressure relief valve should at least provide an air exchange capacity greater than 1 liter per min.

Referring to FIG. 1, one example of an electrified vehicle 12 to which a battery pack according to the present disclosure can be applied is shown. Although depicted as a hybrid electric vehicle (HEV), it should be understood that the battery pack according to the present disclosure may be applied to other types of electrified vehicle, such as plug-in deep hybrid electric vehicles (PHEVs), pure electric vehicles (BEVs), full hybrid electric vehicles (FHEVs), etc.

In one embodiment, a powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery assembly. In this example, the second drive system is considered an electric drive system of the powertrain 10. The first and second drive systems generate torque to drive one or more sets of vehicle drive wheels 28 of the electrified vehicle 12. Although a power-split configuration is shown in this illustrative embodiment, this disclosure extends to any hybrid electric vehicle including full hybrids, parallel hybrids, series hybrids, mild hybrids or micro hybrids. The engine 14 and the generator 18 may be connected through a power transfer unit 30. In addition to planetary gear set, other types of power transfer units may be used to connect the engine 14 to the generator 18. In a non-limiting embodiment, the planetary gear set includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The battery assembly 24 is an example type of battery assembly for an electrified vehicle. The battery assembly 24 may provide power to drive a motor, and in regenerative braking, the motor 22 and generator 18 may output power to the battery assembly 24 for storage. The battery assembly 24 may include a high voltage battery pack, which may include a plurality of battery arrays. In the following embodiments, battery packs that can be incorporated into the above-described example electrified vehicles are provided.

Figure 2:
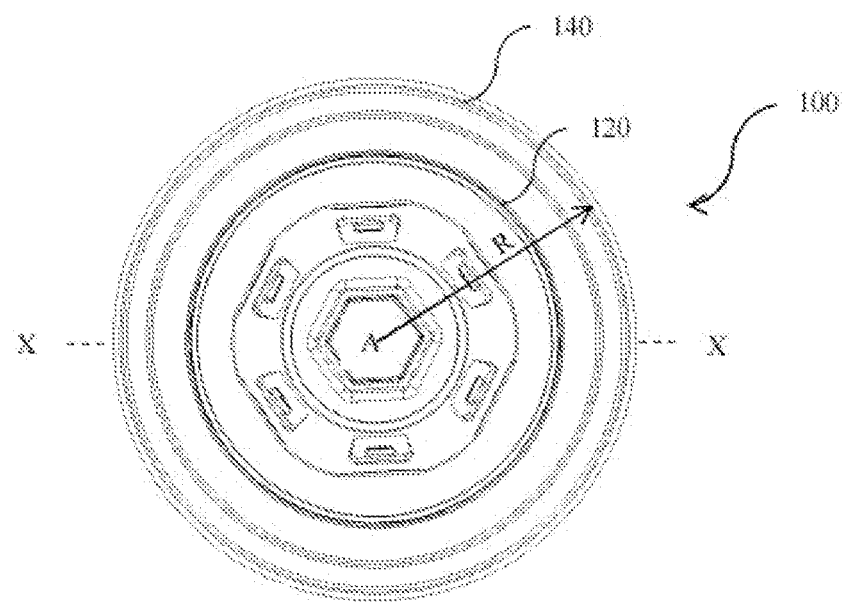
FIG. 2 shows a top view of a pressure relief valve that may be incorporated into a vehicle battery pack according to an embodiment of the present disclosure.

FIG. 2 is a top view of a pressure relief valve 100 according to one or more embodiments of the present disclosure. As shown in the figure, the pressure relief valve 100 has a valve cover 120 and a protective wall 140 arranged on the outside of the valve cover 120 in a radial direction R. In order to facilitate the description of embodiments below, the direction extending perpendicular to the plane where the top view of the pressure relief valve 100 is located is set as axial direction A. It can be understood that in other embodiments, the pressure relief valve 100 can be directly connected to a battery pack without an additional air guide device. The configuration of the pressure relief valve 100 will be described below with reference to further drawings.

Figure 3:
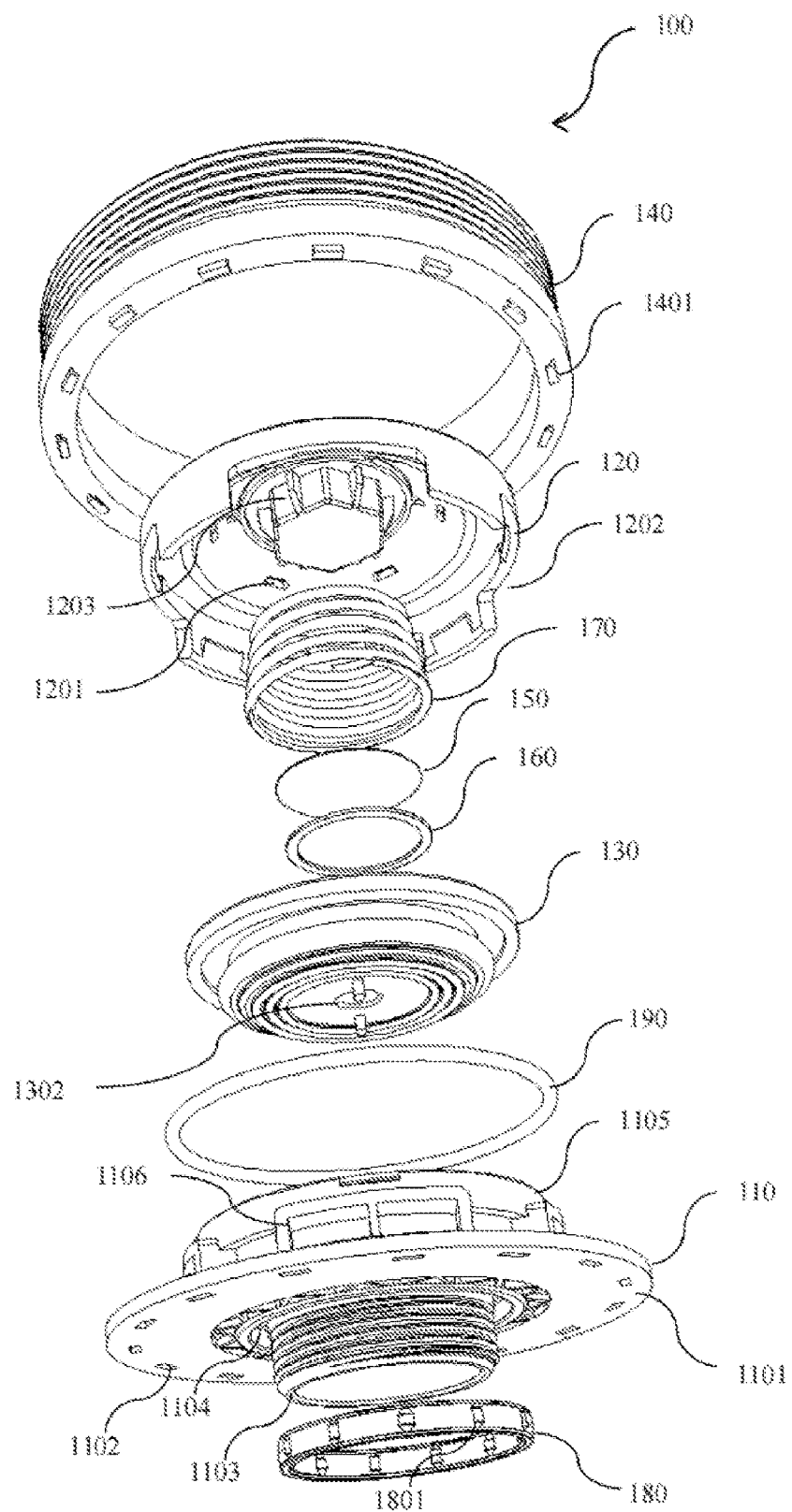
FIG. 3 shows a structural diagram of a pressure relief valve that may be incorporated into a vehicle battery pack according to an embodiment of the present disclosure.

FIG. 3 is an exploded structural diagram of the pressure relief valve 100 for the battery pack according to an embodiment of the present disclosure. It should be understood by those skilled in the art that although the structure of the pressure relief valve in the present disclosure is applied to the battery pack of the vehicle, various pressure relief valves can also be applied to any suitable scenario where pressure balance inside and outside the container is required.

Referring to FIG. 3, in one or more embodiments of the present disclosure, the pressure relief valve 100 is provided. The pressure relief valve 100 has a valve body 110 extending substantially in the axial direction A and the valve cover 120 matched with the valve body and having a plurality of exhaust holes 1201 for gas exchange. The pressure relief valve 100 also has a flexible element 130 positioned between the valve body 110 and the valve cover 120. In combination with an embodiment of the flexible element 130 in FIG. 5, it can be seen that the flexible element 130 has a flange 1303 extending in its circumferential direction. The flange 1303 is at least partially arranged in a groove arranged in the circumferential direction of a projection portion 1105 of the valve body 110, and the valve cover 120 presses the flange 1303 into the groove to realize the positioning of the flexible element. It can be understood that the positioning of the flexible element 130 can also be realized by bonding, welding and other joint methods known in the art.

The flexible element 130 has a compression portion 1301. The flexible element 130 also has a through hole 1302 as shown in FIG. 3. A breathable film 150 is also arranged between the valve cover 120 and the flexible element 130, and the breathable film 150 covers the through hole 1302. In one or more embodiments of the present disclosure, the breathable film 150 only allows two-way passage of gas, and can prevent moisture and dust from entering the interior of the pressure relief valve 100. Depending on the sealing requirements, the appropriate waterproof and breathable film on the market can be selected. In one or more embodiments of the present disclosure, the breathable film 150 is connected to the flexible element 130 through a connecting ring 160. It can be understood by those skilled in the art that the breathable film 150 can be connected to the flexible element 130 through the connecting ring 160 using connection methods known in the art, including but not limited to bonding, welding, and so on, so as to cover the through hole 1302 arranged on the flexible element 130.

In the described embodiment, the breathable film 150 is welded to the through hole 1302 at the bottom area of the flexible element 130 along the direction shown in the figure. It can be understood that in other embodiments, the through hole 1302 can be formed at an upper part, or the through hole 1302 can be formed at any suitable position such as the middle area of the flexible element 130.

In the described embodiment, the valve body 110 has a flange structure 1101 extending in the circumferential direction. The flange structure 1101 is generally annular planar, and can have a relatively smooth surface to facilitate the fitting of the connection surfaces. It can be understood by those skilled in the art that depending on the surfaces to be engaged during application, the flange structure can also have other structural variants.

In the described embodiment, the flange structure 1101 has an edge larger than the size of the valve cover 120 and a plurality of clamping grooves 1102 in its circumferential direction. The valve cover 120 can be connected with the valve body 110 through a buckle or other suitable structure. In one embodiment of the present disclosure, after the valve cover 120 is connected with the valve body 110, an exhaust port 1202 on the valve cover 120 forms another fluid channel between the valve cover 120 and the valve body 110. In one or more embodiments of the present disclosure, the projection portion 1105 of the valve body 110 has an generally M-shaped joint portion 1106 that is adapted to the valve cover 120. The shape adaptive M-shaped joint make the connection between the valve cover 120 and the valve body 110 have higher strength.

Figure 6:
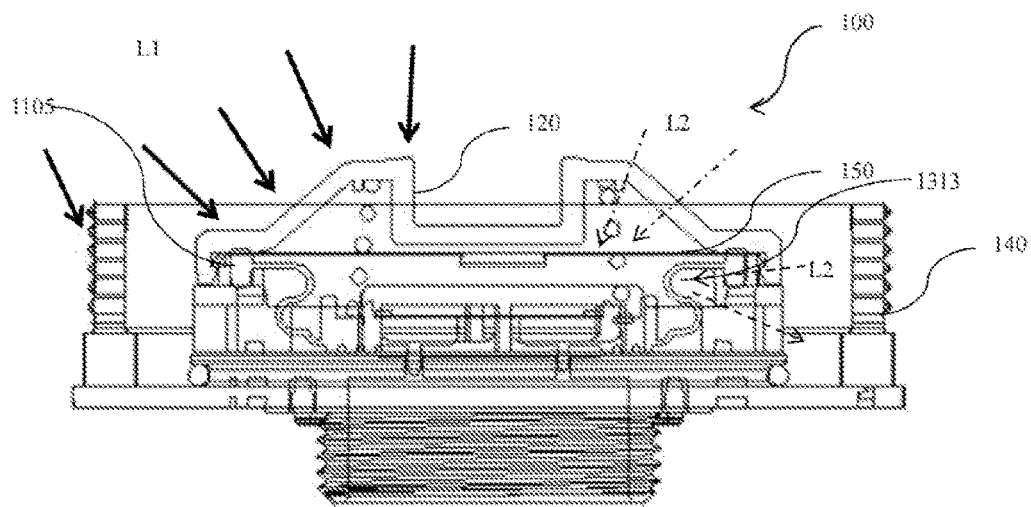
FIG. 6 shows a sectional view of a pressure relief valve according to an embodiment of the present disclosure taken along line X-X of FIG. 2.

In one example, breaking torque between the two exceeds 15 newton meters, and the M-shaped joint portion 1106 can also provide parallel fluid channels at the side of the valve body 110. As shown in FIG. 6, when water vapor L2 enters, it can enter the side of the flexible element 130 close to the valve cover 120, that is, the outside of the breathable film 150, from the opening of the valve cover located above as shown by the dot-dash line in FIG. 6. Since the breathable film 150 is a waterproof breathable film, this channel can prevent moisture from entering. It can also be understood that the water vapor L2 may enter from the side as shown by the dash line in FIG. 6. Due to the guidance and blocking of a guide surface 1313 provided by a concave part 1311 of the flexible element 130, the water vapor L2 entering from the side will be discharged from the side of the valve body 110 along the guide surface 1313, thus preventing the water vapor L2 from entering the interior of the pressure relief valve 100.

Further referring to FIG. 3, in order to install the pressure relief valve 100 to a component to be connected, at the axially downward end of the pressure relief valve 100, a connecting portion 1103 can be extended from the flange structure 1101, and the connecting portion 1103 can have an external thread structure, so as to be configured for connecting to the component to be connected.

In one embodiment, the pressure relief valve 100 can be directly connected to a battery pack through the connecting portion 1103, while the flange structure 1101 is located outside the battery pack housing. A groove 1104 is arranged around the connecting portion 1103, and a gasket 180 is partially arranged in the groove 1104. The gasket 180 is separated from the connecting portion 1103 to prevent the connecting portion 1103 or the edge of the through hole of the component to be connected from disturbing the gasket 180 during installation. The groove 1104 helps to stabilize the positioning of the gasket 180, and the gasket 180 can rests against the surface to be engaged to achieve stable sealing. In the described embodiment, the gasket 180 also has a plurality of spaced projecting ribs 1801 to achieve a stable fit in the groove 1104. In the described embodiment, the gasket 180 can be an EPDM (Ethylene Propylene Diene Monomer) gasket.

As shown in FIG. 3, the pressure relief valve 100 also has a bias spring 170 positioned between the valve cover 120 and the flexible element 130. In the embodiment containing the bias spring 170, the flexible element 130 is offset by the bias spring 170 to rest against an upward facing surface of the valve body 110 in the axial direction A. In another embodiment of the present disclosure, the pressure relief valve 100 does not have a bias spring, but the flexible element 130 is directly pressed against the upward facing surface of the valve body 110 in the axial direction A by the valve cover 120. In one or more embodiments of the present disclosure, a mount 1203 for the bias spring 170 is arranged on an inner side of the valve cover 120, so that the bias spring 170 can be more accurately positioned around the mount 1203 to maintain the proper installation position.

In one or more embodiments of the present disclosure, the pressure relief valve 100 also has the protective wall 140 arranged around the valve body 110. The protective wall 140 has a generally flat cylindrical structure, and the protective wall 140 has an inner surface and an outer surface. The protective wall 140 is clamped with the clamping grooves 1102 of the flange structure 1101 through a plurality of clamping parts 1401 arranged on one end thereof. Those skilled in the art can understand that the connection between the protective wall 140 and the flange structure 1101 can also be realized by welding, bonding and other connection methods known in the art. The protective wall 140 may be used for connecting with external components to be connected.

As shown in FIG. 6, when conducting a waterproof performance test of the pressure relief valve 100, for example, in the waterproof grade test of IP9K, when a high-pressure water gun sprays high-pressure liquid L1 from different directions as shown by the thick arrows in FIG. 6, the protective wall 140 and the valve cover 120 ensure that the high-pressure liquid will not directly enter the gas path of the pressure relief valve 100, so that the pressure relief valve 100 can meet the waterproof performance requirements of IP9K.

Figure 4:
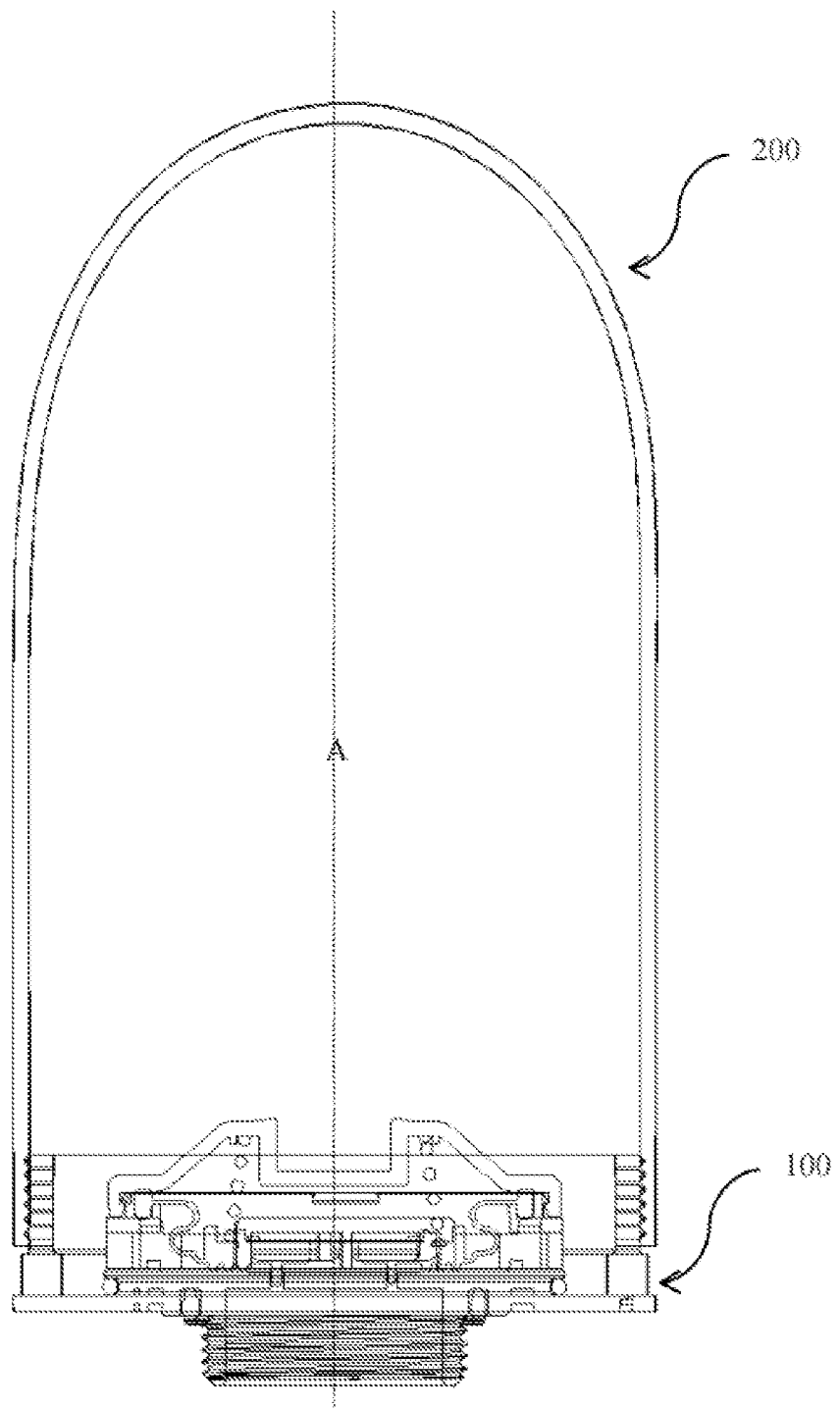
FIG. 4 shows a sectional view of a pressure relief valve according to an embodiment of the present disclosure with a shield tube attached and taken along line X-X of FIG. 2.

Next, as shown in FIG. 4, a schematic diagram of the connection state between the pressure relief valve 100 and a shielding pipe 200 is shown, wherein the pressure relief valve 100 is shown in the form of a sectional view taken along X-X direction of FIG. 2. As shown in the figure, in the described embodiment, the shielding pipe 200 is connected to the thread on the outer surface of the protective wall 140 through the thread on its inner surface to realize the connection between the shielding pipe 200 and the pressure relief valve 100. It should be understood by those skilled in the art that other well-known connection methods such as welding, clamping, bonding, etc. can also be used for the connection of the shielding pipe 200 and the pressure relief valve 100. By connecting the shielding pipe 200, the pressure relief valve 100 can effectively isolate the high-temperature gas from the surrounding parts when relieving under the high-pressure state. It should also be understood by those skilled in the art that, in addition to the shielding pipe 200 in the above embodiment, other components can also be used to connect with the protective wall 140 to achieve different technical purposes, for example, connecting to HVAC (Heating Ventilation and Air Conditioning) system of the vehicle through other pipes to achieve heat exchange with the HVAC system of the vehicle.

Figure 5:
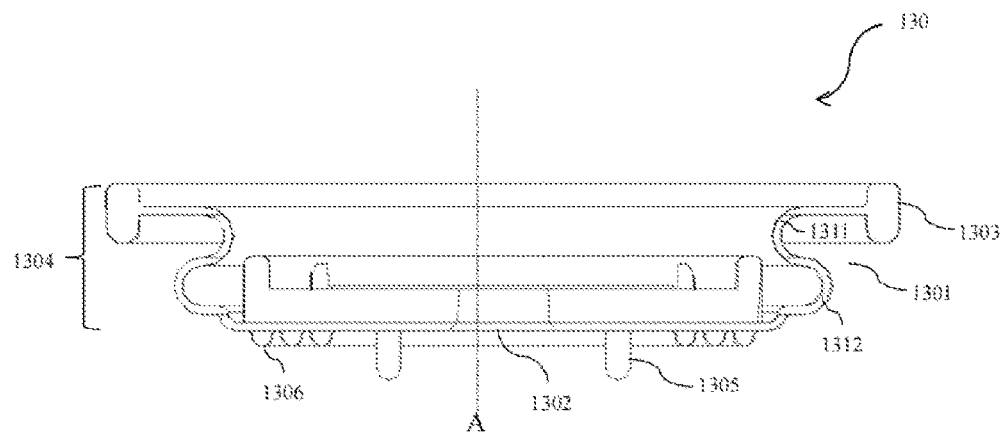
FIG. 5 shows a schematic flow path of gas inflow in a sectional view of the flexible element according to an embodiment of the present disclosure taken along line X-X of FIG. 2.

Next, in combination with the X-X direction sectional view of the flexible element 130 shown in FIG. 5, in one or more embodiments of the present disclosure, the flexible element 130 has a compression portion 1301 arranged around the outer side of the through hole 1302 generally in the radial direction. The compression portion 1301 is made of rubber material. It can be understood by those skilled in the art that other elastic materials known in the art can also be used for the compression portion in the embodiments of the present disclosure. The flexible element 130 has a circumferential wall portion 1304 that surrounds the through hole 1302 and extends upward from the bottom in the axial direction A. The compression portion 1301 is arranged on at least a portion of the circumferential wall portion 1304. The compression portion 1301 is arranged as a concave part 1311 extending inwards and a convex part 1312 extending outwards from the circumferential wall portion 1304 in the radial direction R. In the described embodiment, the compression portion 1301 has one concave part 1311 and one convex part 1312 arranged on the circumferential wall portion 1304 in an axial direction. Along the axial direction of the valve body, the concave part 1311 and the convex part 1312 form a compression portion 1301 with an approximate S-shaped section shape. When the internal pressure of the battery pack increases, the S-shaped compression portion 1301, which is composed of the concave part 1311 and the convex part 1312, can undergo deformation along the axial direction to make the flexible element 130 and the valve body 110 produce relative displacement, thereby forming a fluid channel between the flexible element 130 and the valve body 110 to complete the pressure relief of the battery pack. It can be understood that the compression portion 1301, that includes one concave part 1311 and one convex part 1312 in the above embodiments, is only an example of the compression portion of the present disclosure, and in other embodiments of the present disclosure, the compression portion 1301 may include only one concave part or one convex part, or a plurality of concave parts and convex parts spaced in the axial direction. The pressure for opening the fluid channel can be effectively adjusted by installing compression portions 1301 with different numbers of concave parts and convex parts.

As shown in FIG. 5, in one or more embodiments of the present disclosure, guide pins 1305 extending downward in the axial direction are arranged at bottom of the flexible element 130, and the guide pins 1305 are accommodated in fitting holes arranged on the valve body 110 so as to make the flexible element 130 more stable when it is displaced relative to the valve body 110, without tilting to one side, thus affecting the gas discharge. In the described embodiment, the flexible element 130 includes two guide pins 1305. Those skilled in the art can understand that the flexible element 130 with two guide pins 1305 is only an example, and the number of guide pins 1305 can be increased or decreased as needed. In addition, a plurality of ribs 1306 are arranged on the outside of the bottom of the flexible element 130 and extends on the outer surface of its bottom. When the flexible element 130 butts against the valve body 110, the friction between the flexible element 130 and the valve body 110 is increased through the plurality of ribs 1306, so that the flexible element 130 is better positioned on the bottom surface of the valve body 110. It can be understood by those skilled in the art that the ribs can also be arranged on the radial outer side of the flexible element, and the beneficial effect of better positioning the flexible element 130 can also be obtained by butting the rib arranged on the radial outer side with the inner surface of the projection portion 1105 of the valve body 110. In one or more embodiments of the present disclosure, an O-ring 190 is sleeved on the outer surface of the projection portion 1105. The O-ring 190 is partially sleeved with a groove (not shown in the figure) arranged on the outer surface of the projection portion 1105. The depth of the groove is less than the diameter of the O-ring 190, so that the O-ring 190 is partially located outside the groove. When performing the leak test of the pressure relief valve 100, an air supply pipe can be sleeved on the outside of the O-ring 190 to facilitate the leak test. In one embodiment of the leak test, the air supply pipe provides 4 kilopascals of gas pressure towards the outside of the pressure relief valve. In order to provide sufficient flow of gas during the leak test, the air flow channel of the pressure relief valve 100 should meet the requirement of at least 50 liters per min of gas flow rate under 4 kilopascals of gas pressure.

Figure 7A:
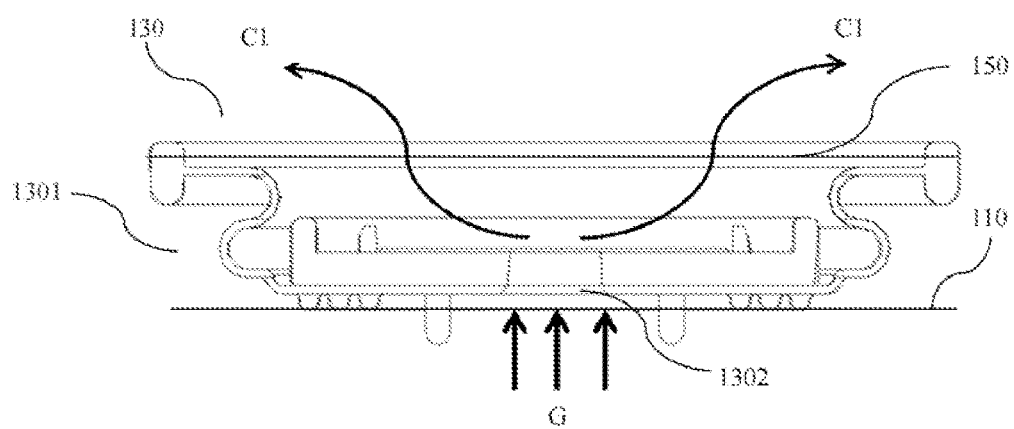
FIG. 7A shows a gas flow direction diagram when a first fluid channel is opened according to an embodiment of the present disclosure.

After the pressure relief valve 100 is installed on the component to be connected, such as the battery pack, as shown in FIG. 7A, the breathable film 150 forms a first fluid channel C1 for direct gas exchange between the battery pack and the external environment, while the flexible element 130 forms a second fluid channel C2 for gas exchange between the battery pack and the external environment. When the internal pressure of the pressure relief valve is less than a set pressure threshold, only the first fluid channel C1 remains open, and gas G can flow to the breathable film 150 through the through hole 1302, thus flowing to the external environment through the first fluid channel C1.

Figure 7B:
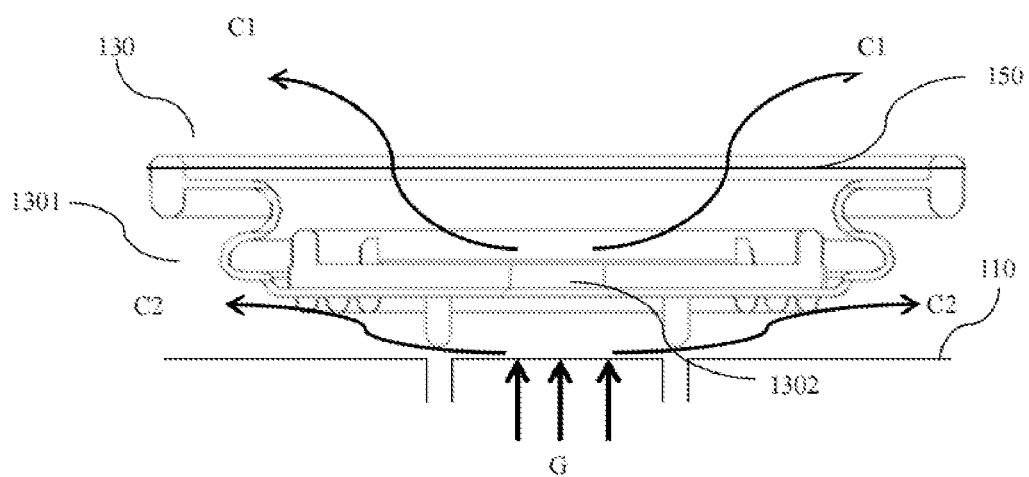
FIG. 7B shows a gas flow direction diagram when a first fluid channel and a second fluid channel are both open according to an embodiment of the present disclosure.

When the internal temperature of the battery pack rises rapidly (for example, due to rapid charging, high output power, etc.), the internal pressure may rise rapidly. When the internal pressure rises rapidly beyond the set pressure threshold, as shown in FIG. 7B, compared with FIG. 7A, when the internal gas pressure of the battery pack increases, the thickness of the compression portion 1301 is compressed as a whole, making the flexible element 130 move relative to the valve body 110, so that the flexible element 130 is separated from the valve body 110 to open the second fluid channel C2. The internal gas can be discharged simultaneously through the first fluid channel C1 and the second fluid channel C2 to rapidly reduce the internal pressure. It can be understood that the pressure threshold can be set according to the structure of the compression portion 1301 and the number of concave parts 1311 and convex parts 1312. The setting requirement of the pressure threshold can be met by adjusting the structure of the compression portion 1301 and/or the number of concave parts 1311 and convex parts 1312.

In combination with the example of gas flow in FIG. 6, FIG. 7A and FIG. 7B, when the air pressure difference on both sides of the pressure relief valve 100 is below the threshold, the gas can be exchanged on both sides of the breathable film 150, that is, only the first fluid channel C1 allows the gas to form gas exchange between the inner and outer sides of the pressure relief valve 100. In one embodiment of the present disclosure, the pressure threshold is 6.5 kilopascals. When the air pressure inside the pressure relief valve 100 increases rapidly and exceeds the threshold due to the discharge of a large amount of gas F from the battery pack, the compression portion 1301 of the flexible element 130 is compressed and separated from the valve body 110, so that the second fluid channel C2 opens rapidly, the first fluid channel C1 and the second fluid channel C2 thus jointly discharge the gas F in the battery pack, and maintain stable air pressure on both sides of the pressure relief valve 100. The greater the pressure inside the battery pack, the greater the degree of compression of the compression portion 1301, and thus the greater the degree of opening of the second fluid channel C2, and the faster the gas can be discharged from the inside of the pressure relief valve 100. The gas discharged from the first fluid channel C1 can be discharged through an exhaust hole 1201 on the valve cover 120 and the exhaust port 1202 on the side of the valve cover 120, while the gas discharged from the second fluid channel C2 can also be discharged through the exhaust hole 1201 and the exhaust port 1202. In one or more embodiments of the present disclosure, when the internal pressure increases due to the rapid increase of the internal temperature of the battery pack, the first fluid channel C1 and the second fluid channel C2 jointly provide sufficient air flow channels for the pressure relief of the battery pack, for example, when the internal pressure is 7 kilopascals, the air flow capacity of more than 12 liters per second is provided.

In the described embodiment, the gas discharged from the exhaust hole 1201 and the exhaust port 1202 may be high-temperature gas. After the gas is discharged from the pressure relief valve 100, it arrives at the shielding pipe 200 and is collected directionally by the shielding pipe 200. The shielding pipe 200 provides the guidance and orientation function of high-temperature gas, so that the centralized treatment of the high-temperature gas can be achieved without causing the vehicle parts near the battery pack to be exposed to high temperatures.

On the premise that it is technically feasible, the technical features listed above for different embodiments can be combined with each other to form other embodiments within the scope of the present disclosure.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A pressure relief valve for a battery pack, comprising:
a valve body;
a valve cover matched with the valve body;
a flexible element positioned between the valve body and the valve cover and having a through hole; and
a breathable film covering the through hole, wherein the flexible element has a compression portion at least partially surrounding the through hole and configured to be deformable to make the flexible element displace relative to the valve body, wherein the flexible element has a circumferential wall portion that surrounds the through hole and extends upward in an axial direction, and the compression portion is arranged on the circumferential wall portion.

2. The pressure relief valve according to claim 1, wherein the flexible element is made of rubber material.

3. The pressure relief valve according to claim 1, wherein the pressure relief valve also has a protective wall surrounding the valve body and having an outer surface and an inner surface.

4. The pressure relief valve according to claim 3, wherein the protective wall is detachably connected to the valve body, and the outer surface is detachably connected with a shielding pipe.

5. The pressure relief valve according to claim 1, wherein the compression portion is provided as at least one convex or concave part extending from the circumferential wall portion along a radial direction from a center of the through hole towards the circumferential wall portion.

6. The pressure relief valve according to claim 5, wherein the compression portion is provided as a plurality of convex and concave parts spaced in the axial direction on the circumferential wall portion.

7. The pressure relief valve according to claim 1, wherein the circumferential wall portion has an outer flange, and the outer flange is pressed in a groove arranged on the valve body by the valve cover.

8. The pressure relief valve according to claim 1, wherein guide pins extending downward along the axial direction are arranged at a bottom of the flexible element, and the guide pins are configured to be accommodated in fitting holes arranged on the valve body.

9. The pressure relief valve according to claim 1, wherein the pressure relief valve also has a spring positioned between the valve cover and the flexible element, and the flexible element is offset by the spring to contact the valve body.

10. The pressure relief valve according to claim 9, wherein at least one rib is arranged on an outside of a bottom of the flexible element and extends on a surface of the outside.

11. A pressure relief valve, comprising:
a valve body;
a valve cover matched with the valve body;
a flexible element positioned between the valve body and the valve cover and having a compression portion and a through hole; and
a breathable film covering the through hole, wherein the breathable film forms a first fluid channel of the pressure relief valve, and the flexible element and the valve body together form a second fluid channel of the pressure relief valve;
wherein the first fluid channel is configured to remain open when internal pressure of the pressure relief valve is less than a pressure threshold;
wherein both the first fluid channel and the second fluid channel are configured to remain open when the internal pressure is greater than or equal to the pressure threshold.

12. The pressure relief valve according to claim 11, wherein the compression portion is configured to be deformable to make the flexible element displace relative to the valve body to open the second fluid channel when the internal pressure is greater than or equal to the pressure threshold.

13. The pressure relief valve according to claim 11, wherein when the internal pressure is less than the pressure threshold, the flexible element rests against the valve body and closes the second fluid channel.

14. The pressure relief valve according to claim 11, wherein the through hole is arranged at a bottom of the flexible element; and
    Wherein the flexible element also has a circumferential wall portion that surrounds the through hole and extends upward in a vertical direction, and the compression portion is arranged on the circumferential wall portion.

15. The pressure relief valve according to claim 14, wherein the compression portion is provided as at least one convex or concave part extending from the circumferential wall portion along a radial direction from center of the through hole towards the circumferential wall portion.

16. The pressure relief valve according to claim 15, wherein the compression portion is provided as a plurality of convex and concave parts spaced in an axial direction on the circumferential wall portion.

17. The pressure relief valve according to claim 11, wherein the pressure relief valve also has a protective wall, the protective wall has an outer surface and an inner surface, and the outer surface is detachably connected with a shielding pipe.

18. The pressure relief valve according to claim 11, wherein the pressure relief valve also has a spring positioned between the valve cover and the flexible element, and the flexible element is offset by the spring to contact the valve body to close the second fluid channel.

19. The pressure relief valve according to claim 11, wherein the breathable film is disposed between the valve cover and the flexible element, the breathable film separate and distinct from both the valve cover and the flexible element.

20. A battery pack for a vehicle, comprising a housing and a pressure relief valve arranged on the housing, wherein the pressure relief valve comprises:
    a valve body;
    a valve cover matched with the valve body;
    a flexible element positioned between the valve body and the valve cover and having a compression portion and a through hole; and
    a breathable film covering the through hole,
    the breathable film forms a first fluid channel of the pressure relief valve, and the flexible element and the valve body together form a second fluid channel of the pressure relief valve,
    when internal pressure of the pressure relief valve is less than a pressure threshold, the first fluid channel remains open; when the internal pressure is greater than or equal to the pressure threshold, both the first fluid channel and the second fluid channel remain open.

* * * * *